(12) United States Patent
Flosbach et al.

(10) Patent No.: US 8,987,404 B2
(45) Date of Patent: *Mar. 24, 2015

(54) TWO-COMPONENT COATING COMPOSITIONS

(75) Inventors: Carmen Flosbach, Wuppertal (DE);
Stefanie Matten, Wuppertal (DE);
Katharina Dreger, Dusseldorf (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/379,537

(22) PCT Filed: Apr. 29, 2010

(86) PCT No.: PCT/US2010/032995
§ 371 (c)(1),
(2), (4) Date: Dec. 20, 2011

(87) PCT Pub. No.: WO2010/127134
PCT Pub. Date: Nov. 4, 2010

(65) Prior Publication Data
US 2012/0101188 A1    Apr. 26, 2012

Related U.S. Application Data

(60) Provisional application No. 61/173,615, filed on Apr. 29, 2009.

(51) Int. Cl.
C08G 18/22 (2006.01)
C08G 18/38 (2006.01)
C08G 18/64 (2006.01)
C08G 18/16 (2006.01)
C09D 175/04 (2006.01)

(52) U.S. Cl.
CPC ............ *C08G 18/225* (2013.01); *C08G 18/222* (2013.01); *C08G 18/3855* (2013.01); *C08G 18/6453* (2013.01); *C08G 18/161* (2013.01); *C08G 18/168* (2013.01); *C08G 18/3876* (2013.01); *C09D 175/04* (2013.01)

USPC .............. 528/48; 528/53; 528/58; 528/76; 528/77; 528/79; 528/85; 528/55; 528/56; 528/57; 524/589; 524/590; 524/591; 524/839; 524/588; 524/840; 524/609; 524/871; 524/873; 524/875

(58) Field of Classification Search
CPC ............ C09D 175/04; C08G 18/3855; C08G 18/6453; C08G 18/168
USPC ......... 524/589, 590, 591, 839, 840, 609, 871, 524/873, 875; 528/48, 58, 53, 85, 76, 79, 528/77

See application file for complete search history.

(56) References Cited

U.S. PATENT DOCUMENTS

2010/0063220 A1 *  3/2010  Van Der Ven et al. ........ 525/452

FOREIGN PATENT DOCUMENTS

| DE | 19614441 | * 10/1997 | ............ C08L 75/04 |
| JP | 06329982 | * 11/1994 | ........... C09D 175/04 |
| WO | WO-2008061839 | * 5/2008 | ............ C08G 18/08 |

OTHER PUBLICATIONS

DE-19614441 English Translation. Oct. 1997.*
Document N_English Translation.*

* cited by examiner

*Primary Examiner* — Michael L Leonard
(74) *Attorney, Agent, or Firm* — Ingrassia Fisher & Lorenz, P.C.

(57) ABSTRACT

The invention relates to a coating composition comprising:
A) at least one thiol-functional compound having at least one thiol group,
B) at least one polyisocyanate cross-linking agent with at least one free isocyanate group and
C) at least one catalyst compound, said catalyst compound comprising at least one catalyst for the curing reaction between the thiol groups of component A and the free isocyanate groups of component B, and at least one cyclodextrine.

20 Claims, No Drawings

TWO-COMPONENT COATING COMPOSITIONS

FIELD OF THE INVENTION

The invention relates to liquid two-component coating compositions which contain cross-linkable binders, cross-linking agents and a latent catalyst for the curing reaction.

DESCRIPTION OF THE PRIOR ART

The use of two-component coating compositions based on a polyisocyanate cross-linking agent and a binder component with functional groups containing active hydrogen is widespread in industrial and vehicle coating, in particular also in vehicle repair coating, due to the very good technological properties of these coating compositions. The coating compositions are here used both in water-based and in solvent-based form.

In particular for use in vehicle repair coating, a short drying time of the coating at moderate temperatures, for example from room temperature up to approx. 60° C., is desired. Drying or curing time may be markedly reduced by using catalysts for the cross-linking reaction. However, using catalysts also simultaneously leads to a reduction in pot life, i.e. a reduction in the time within which the coating composition can still satisfactorily be processed or applied.

Various approaches to solving this problem are already known.

It is known, for example, from WO 01/92362 to use photolatent catalysts, for example amines, in coating compositions based on a polyisocyanate cross-linking agent and a mercapto-functional binder. In the coating composition itself, the photolatent catalyst is inactive and is only activated after application by irradiation with high-energy radiation. An extended pot life may also be achieved in this manner. However, additional UV lamp equipment is required for this purpose and sensitizers, such as thioxanthones or benzophenones, must be used in addition to the photolatent catalysts. Moreover, rapid drying cannot be achieved in areas which are not reached by UV radiation.

Furthermore, it is known from WO 2006/030029 to use latent catalysts that can be activated by moisture in coating compositions containing polythiols and polyisocyanates. However, disadvantage of those coating compositions is that curing depends on the environmental conditions at application, in particular curing is remarkably effected by the humidity of the environment.

It is generally known that cyclodextrines are able to form host-guest-complexes with hydrophobic molecules. Those cyclodextrine complexes are commercially used, for example, in cosmetics, personal toiletries, foodstuff, sportswear and anti-smell sprays.

In addition a few applications of cyclodextrins are disclosed in coatings industry.

For example, in U.S. Pat. No. 4,711,936 the use of curing agents for epoxy resins has been disclosed, those curing agents comprising a cyclodextrin clathrate compound of a compound that is reactive with epoxy groups. The curing agent also contains a trace amount of amylase. The curing agents are stable at room temperature and curing reaction is initiated by heating the curing agent at temperatures of 30° C. or higher. Thereby cyclodextrin is decomposed by the amylase and curing reaction can start.

Also, Japanese patent application JP 06-329982 discloses rapidly curing mold polyurethane coatings. The compositions are solvent-based and comprise a mixture of a polyisocyanate, a polyol, cyclodextrin and a curing catalyst for the hydroxyl/isocyanate curing reaction, wherein the cyclodextrin serves as a host for the catalyst. Cyclodextrin and an amine catalyst are dissolved in N-methyl-2-pyrrolidone or in dimethyl formamide, then the mixture is added to the polyol component and mixed with the isocyanate component.

Coating compositions containing thiol-functional compounds and polyisocyanate cross-linkers have not been disclosed in connection with cyclodextrin-catalyst complexes.

There is accordingly still a requirement for two-component coating compositions, based on a binder component with reactive thiol groups and polyisocyanate cross-linking agents, which combine an adequate working time (pot-life) with a very fast drying even at moderate temperatures of for example room temperature or 40° C. to 60° C. The coating compositions should here yield coatings with very good technological properties, such as for example very good hardness and resistance to chemicals and water, and unblemished optical appearance. Even the formulation of clear coats with excellent optical appearance should be possible.

SUMMARY OF THE INVENTION

This invention relates to two-component coating compositions, in particular to organic solvent-based coating compositions, which contain thiol-functional compounds, polyisocyanate cross-linking agents and a latent catalyst for the curing reaction.

The invention is therefore directed to coating compositions, in particular to organic solvent-based coating compositions, comprising:
  A) at least one thiol-functional compound having at least one thiol group,
  B) at least one polyisocyanate cross-linking agent having at least one free isocyanate group and
  C) at least one catalyst compound, said catalyst compound comprising at least one catalyst for the curing reaction between the thiol groups of component A and the at least one free isocyanate group of component B, and at least one cyclodextrin.

It has been found that the coating compositions based on components A), B) and C) above have improved pot-life of, for example, 60 minutes to 20 hours, while retaining very short drying times at room temperature or at elevated temperatures of, for example, 5-30 minutes at 40-80° C. Unexpectedly it has been found that the desired long pot-life and the required short drying times could be achieved when using the catalyst compounds C) in the very fast curing thiol/polyisocyanate system.

DETAILED DESCRIPTION OF THE EMBODIMENTS

These and other features and advantages of the present invention will be more readily understood, by those of ordinary skill in the art, from a reading of the following detailed description. It is to be appreciated those certain feature of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

Also, the disclosure of various ranges with numerical values specified in this application is intended as continuous range including every value between the minimum and maximum values, including the minimum and maximum end points of the range.

The term (meth)acrylic as used here and hereinafter should be taken to mean methacrylic and/or acrylic.

Unless stated otherwise, all the molar mass data, number-average molar mass data Mn or weight-average molar mass data Mw stated in the present description are molar masses determined or to be determined by gel permeation chromatography (GPC; divinylbenzene-crosslinked polystyrene as the immobile phase, tetrahydrofuran as the liquid phase, polystyrene standards).

The coating compositions according to the invention are liquid coating compositions comprising cross-linkable binders, cross-linking agents and a liquid carrier. The liquid carrier is usually an organic solvent or a mixture of organic solvents. Therefore, the coating compositions may be organic solvent-based. The coating compositions may be also solvent-free, even if this embodiment is not a preferred one.

Organic solvent-based coating compositions are coating compositions, wherein organic solvents are used as solvent or thinner when preparing and/or applying the coating composition. Usually, organic solvent-based coating compositions contain about 20 to 80% by weight of organic solvents, based on the total amount of the coating composition.

The pot life is the time within which, once the mutually reactive components of a coating composition have been mixed, the coating composition may still be properly processed or applied and coatings of unimpaired quality can be achieved.

The coating compositions according to the invention are two-component coating compositions. The handling of two-component coating compositions generally requires mixing together the reactive components shortly before application to avoid premature reaction of the reactive components. The term "shortly before application" is well-known to a person skilled in the art working with two-component coating compositions. The time period within which the ready-to-use coating composition may be prepared prior to the actual use/application depends, e.g., on the pot life of the coating composition. Therefore, a sufficient long pot life is desired in order to have a comfortable time window for preparing/mixing and applying the two-component coating compositions.

The coating compositions according to the invention comprise the components A), B) and C).

Components A) and B) which are reactive with each other shall be stored separately and mixed together only shortly before application. Component C) can be either part of component A) and/or B) or can be a separate component. Preferably component C) is part of component A) or is a separate component.

Usually the coating compositions of the present invention comprise 20-80% by weight solids, preferably 30-70% by weight solids of the at least one component A) and 20-80% by weight solids, preferably 30-70% by weight solids of the at least one cross-linking agent B), relative to the entire coating composition.

The coating composition of the present invention preferably comprises the at least one catalyst compound C) in a ratio by weight of solids of catalyst compound C) to the sum of solids of thiol component A) and isocyanate component B) of 0.5 to 15, more preferred of 1 to 8.

Component A) of the coating composition according to the invention comprises monomeric, oligomeric or polymeric compounds with at least one thiol group. Thiol-functional compounds can be compounds in the form of low molar mass compounds defined by empirical and structural formula with molar mass in the range of 200 to 600 or oligomeric or polymeric binders. The binders are compounds with a number average molar mass (Mn) of, e.g., 500 to 500,000 g/mole, preferably of 1100 to 300,000 g/mole.

Thiol-functional compounds A) that can suitably be used in the coating composition according to the invention include dodecyl mercaptan, mercapto ethanol, 1,3-propanedithiol, 1,6-hexanedithiol, methylthioglycolate, 2-mercaptoacetic acid, mercaptosuccinic acid, and cysteine. Also suitable are esters of a thiol-functional carboxylic acid with a polyol, such as esters of 2-mercaptoacetic acid, 3-mercaptopropionic acid, 2-mercapto-propionic acid, 11-mercaptoundecanoic acid, and mercaptosuccinic acid. Examples of such esters include pentaerythritol tetrakis(3-mercaptopropionate), pentaerythritol tetrakis(2-mercaptoacetate), trimethylol propane tris(3-mercaptopropionate), trimethylol propane tris(2-mercaptopropionate), and trimethylol propane tris(2-mercaptoacetate). A further example is a compound of a hyperbranched polyol core based on a starter polyol, e.g. trimethylol propane and dimethylol propionic acid, which is subsequently esterified with 3-mercaptopropionic acid and isononanoic acid. Those compounds are described for example in EP 0 448 224.

Thiol-functional compounds can also be prepared by addition of $H_2S$ to epoxy-functional compounds. These compounds may have a structure of the following formula $T[(O—CHR—CH_2—O)_nCH_2CHXHCH_2YH]_m$, with T being a m valent organic moiety wherein m is an integer between 1 and 25, R being hydrogen or methyl, n being an integer between 0 and 30, X and Y being oxygen or sulfur, with the proviso that X and Y are not equal.

Other syntheses to prepare compounds comprising thiol-functional groups include: the reaction of an aryl or alkyl halide with NaHS to introduce a pendant mercapto group into the alkyl and aryl compounds; the reaction of a Grignard reagent with sulfur to introduce a pendant mercapto group into the structure; the reaction of a polymercaptan with a polyolefin according to a nucleophilic reaction; an electrophilic reaction or a radical reaction; the reaction of disulfides.

In another embodiment the thiol group of the thiol-functional compound A) can be covalently attached to a resin. Such resins include thiol-functional polyurethane resins, thiol-functional polyester resins, thiol-functional polyaddition polymer resins, thiol-functional polyether resins, thiol-functional polyamide resins, thiol-functional polyurea resins, and mixtures thereof. Thiol-functional resins can be prepared by the reaction of $H_2S$ with an epoxy group or an unsaturated carbon-carbon bond-containing resin, the reaction between a hydroxyl-functional resin and a thiol-functional acid, and by the reaction of an isocyanate-functional polymer and either a thiol-functional alcohol or a di- or polymercapto compound.

A thiol-functional polyurethane resin can be the reaction product of a mono-, di-, tri- or tetrafunctional thiol compound with an isocyanate-terminated polyurethane and preferably is the reaction product of a diisocyanate compound and a dial-functional compound. Suitable thiol-functional polyurethane resins are obtainable by first preparing an isocyanate-functional polyurethane from dials, diisocyanates, and optionally compounds with ionic or non-ionic hydrophilic groups to stabilize the resin in an aqueous phase, followed by reaction of the isocyanate-functional polyurethane with a polyfunctional thiol in a base-catalyzed addition reaction.

The thiol-functional resin can also be a polyester prepared from at least one polycarboxylic acid or reactive derivatives thereof, at least one polyol, and at least one thiol-functional carboxylic acid. The polyesters preferably possess a branched structure.

The thiol-functional resin can also be a thiol-functional polyaddition polymer, for example a poly(meth)acrylate. Such a poly(meth)acrylate is derived from hydroxyl-functional (meth)acrylic monomers, such as hydroxyethyl(met)) acrylate, hydroxypropyl(meth)acrylate, hydroxybutyl(meth) acrylate, and other ethylenically unsaturated polymerizable monomers as can be usually used for the preparation of poly (meth)acrylates. Examples of other ethylenically unsaturated monomers are carboxyl functional olefinically unsaturated monomers, such as acrylic acid or methacrylic acid and unsaturated monomers, which contain apart from an olefinic double bond no further functional groups are, for example, aliphatic esters of olefinically unsaturated carboxylic acids, vinyl ester and for vinylaromatic hydrocarbons.

Examples of suitable aliphatic esters of olefinically unsaturated carboxylic acids include, in particular, esters of alpha, beta-olefinically unsaturated monocarboxylic acids with aliphatic alcohols.

The thiol group is introduced by esterification of at least part of the hydroxyl groups of the acrylate copolymer with one or more thiol-functional carboxylic acids, for example, those as described above. Alternatively, glycidyl methacrylate is introduced into the polymer to prepare an epoxy-functional poly(meth)acrylate. The epoxy groups are then reacted with suitable thiol-functional carboxylic acids such as mentioned above.

Examples of suitable thiol functional compounds are described in WO 2006/064035 and WO 2005/123862.

In particular pentaerythritol tetrakis(3-mercapto propionate) and trimethylolpropane tris(3-mercaptopropionate) can be used as thiol-functional compounds A, optionally in combination with other thiol-functional compounds.

The compounds of component A) may contain in addition to the thiol groups at least one other functional group reactive towards isocyanate groups of the cross-linking agent B), for example, at least one hydroxyl group.

Also, the coating composition of the present invention may contain in addition to the thiol-functional compound A) other compounds with functional groups reactive towards isocyanate groups that do not contain thiol groups. For example, hydroxyl-functional compounds can be used in addition to the thiol-functional compounds A. Furthermore, the thiol-functional compound A) may contain, for example, hydroxyl groups in addition to the thiol groups.

Hydroxyl-functional compounds can be compounds in the form of low molar mass compounds defined by empirical and structural formula with molar mass in the range of 200 to 600 or oligomeric or polymeric binders. The binders are compounds with a number average molar mass (Mn) of, e.g., 500 to 500,000 g/mole, preferably of 1100 to 300,000 g/mole.

The binders with hydroxyl groups are for example the polyurethanes, (meth)acrylic copolymers, polyesters and polyethers, known from polyurethane chemistry to the skilled person, which are used in the formulation of organic solvent based or aqueous coating compositions. They may each be used individually or in combination with one another.

In one embodiment the coating compositions of the present invention may comprise hydroxyl-functional compounds, e.g. binders, in addition to thiol-functional compounds A). In a second embodiment the coating compositions of the present invention may be free of hydroxyl-functional compounds, e.g. binders, in addition to thiol-functional compounds A).

The compounds A) can be used individually or in combination.

The coating compositions, according to the invention contain polyisocyanates with free isocyanate groups as cross-linking agents (component B). Examples of the polyisocyanates are any number of organic di- or higher functional isocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 6,000 mPas, preferably, of 5 to 3,000 mPas.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine. The polyisocyanates can also be used in the form of isocyanate-modified resins.

The polyisocyanate cross-linking agents can be used individually or in combination.

The polyisocyanate cross-linking agents are those commonly used in the paint industry, and are described in detail in the literature and are also obtainable commercially.

The catalyst compounds C) contain cyclodextrin and at least one catalyst that is able to accelerate the curing reaction between components A) and B) It is assumed that the catalyst is present in form of a cyclodextrin-complex, i.e. that the cyclodextrin forms with the catalyst a so-called host-guest complex with cyclodextrin as the host and the catalyst as the guest. It is also assumed that the catalyst has no or only very little catalytic activity when being present in form of the cyclodextrin complex, but becomes active during and/or after application and/or during and/or after film formation.

Suitable catalysts are all compounds capable of accelerating the reaction of the thiol groups of the thiol-functional compounds and the isocyanate groups of the isocyanate-functional compounds. Generally, suitable catalysts are basic catalysts. Examples are inorganic basic compounds, such as hydroxides and basic oxides of metals. Suitable examples of hydroxides of metals are sodium, potassium, calcium and magnesium hydroxide. Also, quaternary ammonium hydroxides, such as tetraethyl ammonium hydroxide, can be used.

Furthermore, amines can be used as catalyst in the present invention. Suitable amines that can be used are secondary monoamines, for example, morpholine, diethyl amine, dibutyl amine, N-methyl ethanol amine, diethanol amine, and diisopropanol amine. Also suitable are diamines and polyamines, such as the addition products of epoxides and ammonia or the addition products of epoxides and primary, secondary or tertiary amines.

Also suitable, even if not preferred, are primary amines, such as isopropyl amine, butyl amine, ethanol amine, 3-amino-1-propanol, 1-amino-2-propanol, 2-amino-2-methyl-1-propanol and 2-amino-2-methyl-1,3-propane diol.

Tertiary amines are a particularly suitable class of basic catalysts. Examples of suitable tertiary amines include trimethyl amine, triethyl amine, triisopropyl amine, triisopropanol amine, N,N-dimethyl ethanol amine, dimethyl isopropyl amine, N,N-diethyl ethanol amine, 1-dimethyl amino-2-propanol, 3-dimethyl amino-1-propanol, 2-dimethyl amino-2-methyl-1-propanol, N-methyl diethanol amine, triethanol amine, N-ethyl diethanol amine, N-butyl diethanol amine, N,N-dibutyl ethanol amine, and N-ethyl morpholine.

Also suitable are 1,4-diazabicyclo[2.2.2]octane (DABCO), 1,8-diazabicyclo[5.4.0]undec-7-ene (DBU), 1,5-diazabicylo[4.3.0]non-5-ene, guanidine, guanine, guanosine, melamine, and mixtures and derivatives thereof.

Alternatively the catalyst in the coating composition can be a metal compound with an organic ligand where the metal is a metal of Groups 3 to 13 of the Periodic Table. Preferably, the metal is a transition metal. More preferably, the metal is a metal of group 4 of the Periodic Table, e.g., Zr or Ti.

The metal compounds comprise metal salts and/or complexes of organic compounds. The organic compounds are compounds having 2 to 40 carbon atoms, optionally comprising atoms such as O, N, and S. The metal salts comprise anions selected from the group of carboxylates. Examples thereof include propionate, butyrate, pentanoate, 2-ethyl hexanoate, naphthenate, oxalate, malonate, succinate, glutamate, and adipate. The metal complexes comprise ligands selected from the group of beta-diketones, alkyl acetoacetates, alcoholates, and combinations thereof. Examples thereof include acetyl acetone (2,4-pentanedione), 2,4-heptanedione, 6-methyl-2,4-heptadione, 2,4-octanedione, propoxide, isopropoxide, and butoxide. Preferably, the metal compound is a metal complex. Examples of metals include aluminium, titanium, zirconium, and hafnium.

Examples of metal complexes include aluminium complexed with 2,4-pentanedione, aluminium triacetyl acetonate, zirconium tetraacetyl acetonate, zirconium tetrabutanolate, titanium tetrabutanolate, zirconium complexed with 6-methyl-2,4-heptadione, aluminium triisopropoxide, and titanium diisopropoxide bis-2,4(pentadionate) and titanium acetyl acetonate. Those metal complexes are, for example, commercially available under the trade name Tyzor® from DuPont.

Most preferred catalysts are tertiary amines, for example, the tertiary amines mentioned above. In particular suitable are N,N-dimethyl ethanol amine, 1,4-diazabicyclo[2.2.2]octane (DABCO) and 1,8-diazabicyclo[5.4.0]undec-7-ene (DBU).

As already explained, it is assumed that the catalysts assume the form of host-guest complexes with cyclodextrin. In connection with such complexes, it is described that due to the specific arrangement within the molecule a conical overall structure of the cyclodextrin is obtained, the resultant cavity being capable of accommodating guest molecules.

The cyclodextrins used may be alpha-, beta-, gamma- and delta-cyclodextrins. These are known and also commercially available. They consist of D-glucose units, for example 6 to 13 D-glucose units, preferably 6 to 9 D-glucose units and are joined together via an alpha-1,4-glycoside bond. Cyclodextrin derivatives may also be used. Cyclodextrin derivatives should be taken to mean reaction products of cyclodextrins with reactive compounds. Ester or ether groups conventionally arise from the reaction of cyclodextrins with such reactive compounds. These may for example comprise reaction products of cyclodextrins with alkylene oxides, such as for example ethylene, propylene or butylene oxide, or reaction products of cyclodextrins with alkylating agents, such as for example C1- to C10 alkyl halides, such as methyl, ethyl, butyl, lauryl and stearyl chloride. The cyclodextrin derivatives may exhibit a variable degree of alkylation, for example a degree of alkylation of 20-80%.

It is furthermore also possible to use cyclodextrin derivatives based on reaction products of cyclodextrin with chloroacetic acid and on enzymatic linkage with maltose oligomers. Examples of readily usable cyclodextrin derivatives are methylcyclodextrin, dimethyl-beta-cyclodextrin, hydroxypropylcyclodextrin, acetylcyclodextrin and sulfonatopropylhydroxypropyl-beta-cyclodextrin. Good solubility of the cyclodextrin in organic solvents may in particular be achieved by methylation or hydroxypropylation which facilitates production of the cyclodextrin/catalyst compound and the incorporation thereof into coating compositions.

Methylated and/or hydroxypropylated cyclodextrins may preferably be used.

The cyclodextrins may be used individually or in combination.

Assuming the formation of host-guest cyclodextrin complexes complexation can be seen as a molecular phenomenon where one or more molecules of guest (e.g. the catalyst) and one or more molecules of cyclodextrin come into contact with each other to associate and form a complex. Several methods can be used to form those complexes.

Production of the catalyst/cyclodextrin compound may proceed as follows:

For example, a solution of cyclodextrin is made and the catalyst is added to the solution while stirring. Conditions may be selected such that the solubility of the complex is exceeded and the complex can be collected as precipitate by filtration or centrifugation. As an alternative the solvent may be destilled off.

The cyclodextrin may be dissolved in one or more suitable organic solvents and/or water. Organic solvents which may be used are, for example, alcohols, such as ethanol, propanol, alkoxypropanols, such as methoxypropanol, ethoxypropanol, ketones, such as acetone, methyl ethyl ketone, or ester ketones, such as methoxypropyl acetate. For example, organic or aqueous cyclodextrin solutions containing 1-50% by weight of the cyclodextrin may be produced.

The catalyst is then added to the cyclodextrin solution. The ratio of cyclodextrin molecules to catalyst molecules may be in the range from 1:1 to 4:1 and is preferably conventionally 1:1 to 2:1. An excess of cyclodextrin may be required for some complexes, for example a ratio of cyclodextrin molecules to catalyst molecules of at least 1.2:1. During addition, the catalyst is likewise present dissolved or dispersed in an organic solvent, which may, for example, comprise the same organic solvent or solvent mixture as for the production of the cyclodextrin solution. It is, however, also possible to add the catalyst directly as such. Once the cyclodextrin and catalyst component have been mixed, it is advantageous to perform intimate mixing over an extended period, for example with stirring at room temperature within 5 to 24 hours.

The resultant liquid catalyst/cyclodextrin compound may be used directly as such. It may, however, also be dried under suitable conditions and used as a solid or powder. For example, the solvent may be removed under a vacuum or it may be filtered out or centrifuged off, after which drying may be performed, for example at 50° C. to 70° C.

The powder obtained by means of drying may likewise be re-dissolved in one or more organic solvents and used as a liquid composition.

The catalyst compound C) may, therefore, contain in addition to the catalyst and the cyclodextrin at least one organic solvent and/or water.

Readily usable liquid catalyst compounds C) here comprise, for example, 1-50% by weight, preferably 3-20% by weight of the catalyst and the cyclodextrin.

Selection of the appropriate solvent is determined, for example, by the type of catalyst and the type of cyclodextrin. Moreover, no solvents should be used which themselves have a catalytic action or release the catalyst prematurely. It has been found that, for example, amine nitrogen containing organic solvents such as N-methyl pyrrolidone, N-ethyl pyrrolidone and dimethyl formamide are not preferred organic solvents to prepare a liquid catalyst compound C).

Organic solvents which may particularly readily be used to prepare the liquid catalyst compound C) are alcohols, ether alcohols, ketones and ester ketones. Examples of alcohols are those having 1-6 carbon atoms in the molecule. Examples of useful alcohols are ethanol, propanol, alkoxypropanols, such as methoxypropanol, ethoxypropanol. Examples of useful ketones or ester ketones are acetone, methyl ethyl ketone and methoxypropyl acetate and similar alkoxyalkyl acetates.

According to one embodiment of the present invention catalyst compound C) is a solid compound. Preferably the solid catalyst compound C) consists of at least one catalyst and at least one cyclodextrin.

According to a second embodiment of the present invention catalyst compound C) is a liquid compound. Preferably the liquid catalyst compound C) consists of at least one catalyst, at least one cyclodextrin and at least one organic solvent and/or water.

According to a third embodiment of the present invention catalyst compound C) is a liquid compound containing at least one amine catalyst, at least one cyclodextrin and at least one organic solvent, wherein the at least one organic solvent is not an amine nitrogen containing organic solvent such as N-methyl pyrrolidone, N-ethyl pyrrolidone and dimethyl formamide.

According to a fourth embodiment of the present invention catalyst compound C) is a liquid compound containing at least one amine catalyst, at least one cyclodextrin and at least one organic solvent, wherein the at least one organic solvent is selected from the group consisting of alcohols, ether alcohols, ketones, ester ketones and mixtures thereof.

The resultant liquid or solid catalyst compound C) may then be added to the coating composition or to one of the components of the coating composition. As already mentioned, the catalyst compounds C) may be added to the thiol-functional component A) and/or to the polyisocyanate component B) or stored in said components. It is, however, also possible to provide the catalyst compound C) as a separate component and only to incorporate it as a third component when the thiol component A) and the polyisocyanate component B) are mixed together.

According to a further preferred embodiment, the catalyst compound C) is a constituent of the thiol component A) or is added to the thiol component A), when preparing the final coating composition.

According to a particularly preferred embodiment the at least one thiol-functional compound A) can serve as organic solvent for the catalyst compound C). More preferred a thiol-functional compound that is a compound in the form of low molar mass compound defined by empirical and structural formula with molar mass in the range of 200 to 600 can serve as organic solvent for the catalyst/cyclodextrin compound C). Most preferred pentaerythritol tetrakis(3-mercapto propionate) and/or trimethylolpropane tris(3-mercaptopropionate) can serve as organic solvent for the catalyst compound C). Thereby the at least one thiol-functional compound A) that serves as organic solvent for the catalyst/cyclodextrin compound C) may form alone the thiol component A) or may be a part of the thiol component A) and be used in combination with other thiol-functional compounds.

Therefore, the present invention is also directed to a process for preparing coating compositions, in particular organic solvent-based coating compositions, comprising:
 A) at least one thiol-functional compound having at east one thiol group,
 B) at least one polyisocyanate cross-linking agent having at least one free isocyanate group and
 C) at least one catalyst compound, said catalyst compound comprising at least one catalyst for the curing reaction between the thiol groups of component A and the at least one free isocyanate group of component B, and at least one cyclodextrin,
comprising the steps:
 I. Providing component A),
 II. Mixing component A) provided in step I with a liquid catalyst compound C) or with a solid catalyst compound C) and
 III. Mixing the composition obtained in step II with the polyisocyanate component B).

Thereby component A), component B) and component C) can be stored separately until mixing or a mixture of components A) and C) and a separate component B) can be stored until mixing.

Generally catalyst compound C) can also be mixed first with component B) or with any other ingredient of the coating composition and can then be added in any order to other components of the coating composition to formulate the final coating composition.

It goes without saying that all embodiments and preferred embodiments related to the coating composition and disclosed above in the description of the coating composition also apply for the coating composition to be used in the above process for preparing coating compositions, in particular organic solvent-based coating compositions.

The molar ratio of groups reactive towards functional groups of the cross-linking agent, in particular the thiol and optionally hydroxyl groups from the at least one compound A) to the to the isocyanate groups of the at least one polyisocyanate cross-linking agent B), are for example, 0.5:1 to 3:1, in particular 0.7:1 to 2:1.

Component A, component B or both may contain free-radically polymerizable olefinic double bonds. The coating compositions according to the invention may then be cured not only by the reaction of the thiol groups of component A) with the isocyanate groups of the cross-linking agent B) but additionally by free-radical polymerization of the olefinic double bonds, in particular, by photochemically induced free-radical polymerization. Such compositions are also known as "dual-cure" coating compositions. In one embodiment components A and B are free of additional free-radically polymerizable olefinic double bonds.

The coating compositions according to the invention have a solids content of, for example, 40 to 85 wt. %, preferably 45 to 75 wt. %.

The coating compositions, according to the invention may contain furthermore organic solvents.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, butyl glycol; glycols, for example, ethylene glycol, propylene glycol, and ketones, e.g., methyl ethyl ketone, acetone, cyclohexanone; aromatic or aliphatic hydrocarbons, for example, toluene, xylene, or straight-chain or branched aliphatic C6-C12-hydrocarbons.

The coating compositions, according to the invention, can contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica, graphite effect pigments and iron oxide laminae. Examples of fillers are silicon dioxide, barium sulfate, talcum, aluminum silicate and magnesium silicate.

The additives are additives usually used in the paint industry. Examples of such additives are light stabilizers, for example, based on benzotriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, cross-linked polycarboxylic acid or polyurethanes, anti-foaming agents, wetting agents, photoinitiators. The additives are added in the usual amounts familiar to the person skilled in the art.

Additional curing accelerators for the cross-linking reaction, for example, compounds that are not suited to form a catalyst compound C) or that are not present in form of a catalyst compound C) can be used in small amounts, of e.g. up to 0.5% by weight based on the total coating composition. It is, for example, possible that the coating compositions contain a catalyst/cyclodextrin compound C) with a catalyst for the curing reaction between the thiol groups of component A) and the isocyanate groups of component B), e.g. with an amine catalyst, and contain in addition a free catalyst for the curing reaction between optionally present hydroxyl groups and isocyanate groups, e.g. a metal catalyst, such as a tin catalyst.

The long pot life of the coating composition according to the invention is particularly advantageous. Conventional coating compositions based on thiol-functional binders and free polyisocyanate crosslinking agents are in fact distinguished by extremely limited pot life if no specific measures have been taken. Generally a rapid reaction occurs between the thiol-functional compounds and the polyisocyanate cross-linking agent when mixed with one another, in particular when a curing catalyst is present. This is perceptible, for example, from a drastic increase in the viscosity of the coating composition. For example, when an amine, such as DABCO (1,4-diazabicyclo[2.2.2]octane), or dimethyl isopropyl amine, is added to a composition containing thiol-functional and isocyanate-functional compounds an immediate gelation can be observed. In contrast to that the pot life of the coating compositions according to the invention is substantially long due to the presence of the latent catalyst compound C). The pot life after mixing (when A and B and C are brought into contact) amounts, for example, from 60 minutes up to 20 hours.

It was surprising that a sufficient long pot-life and simultaneously fast curing with the very fast reacting thiol/isocyanate coating system could be achieved, when using the catalyst/cyclodextrin compound C)

The coating compositions of the present invention may be used for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer surfacer layer of a single stage top coat layer or in pigment-free form for the production of an outer clear top coat layer or a transparent sealing layer of a multilayer coating. They may, for example, be used for the production of a clear top coat layer on a previously applied color-imparting and/or special effect-imparting pre-dried base coat layer.

The coating compositions may be applied by means of conventional application methods, in particular, by spraying onto any desired uncoated or precoated substrates, for example, of metal or plastics. Once applied, layers of the coating compositions according to the invention may initially be flashed off to remove solvent, for example. Curing may then proceed at ambient temperature or thermal curing may proceed at temperatures of, for example, 40° C. to 220° C., for example, by baking or irradiating with IR radiation (IR=Infra Red) for 5 to 30 minutes. Radiating with IR radiation can be carried out with usual IR dryers, for example for 3 to 6 minutes at a distance IR dryer/object surface of 50-80 cm.

If the coating compositions according to the invention are dual-cure coating compositions, thermal curing is combined with curing by free-radical polymerization of olefinic double bonds induced by irradiation with high-energy radiation, in particular UV radiation. Thermal curing and radiation curing may here proceed simultaneously or in any desired order. Therefore, the present invention also relates to the use of the coating compositions as defined above in a process for preparing a coating layer, comprising the steps:

1) applying a coating layer from a coating composition as defined above, and
2) thermally curing the coating layer.

Optionally, the applied coating layer may be flashed off to remove organic solvents and water, if present.

It is assumed that during and/or after application and/or film formation the catalyst is released from the catalyst/cyclodextrin compound C) and becomes active to catalyze the curing reaction.

Besides an extremely improved pot-life the coating compositions according to the present invention cure very fast and lead to coatings with excellent early polishing properties and early tack-free time. Also, coating compositions according to the invention lead to coatings with excellent appearance, e.g. coatings with high gloss and without surface defects such as pinholes.

The following examples are intended to illustrate the invention in greater detail. All parts and percentages are on a weight basis unless otherwise indicated.

EXAMPLES

Example 1

Preparation of Catalyst Compounds C)

Catalyst compounds 1A and 1B (examples 1A and 1B) were formulated with the ingredients shown in Table 1.

TABLE 1

|  | Example 1A Parts by weight | Example 1B Parts by weight |
| --- | --- | --- |
| Cyclodextrin (Cavasol ® W7HP) | 20.00 | 20.00 |
| Ethanol | 30.00 | 30.00 |
| 40% solution of DABCO in Ethanol | 3.24 |  |
| 40% solution of DBU in Ethanol |  | 4.40 |

Cavasol ® W7HP: commercially available hydroxypropyl cyclodextrin, from Wacker
Amine catalysts: DABCO (1,4-diazabicyclo[2.2.2]octane), DBU (1,8-diazabicyclo[5.4.0]undec-7-ene)

20 parts by weight of cyclodextrin have been dissolved at room temperature under stirring in 30 parts by weight of ethanol. After complete dissolution the DABCO-solution in case of Example 1A and the DBU-solution in case of Example 1B have been added. Each mixture has been stirred at room temperature for 20 hours.

Afterwards the mixtures have been dried at a temperature of 60° C. by means of a rotating evaporator until a residue content of solvent of <2% by weight has been reached.

Example 2

Preparation of Clear Coat Compositions

Clear coat compositions based on a combination of a mercapto-functional compound and a hydroxy-functional polyester have been used as clear coat base components. Clear coat base components according to the invention containing an amine/cyclodextrin compound were formulated and comparative clear coat base components without catalyst for the SH/NCO reaction were formulated as well as comparative clear coat base components containing the free amine catalyst.

Desmodur® N3600, a HDI-trimer based polyisocyanate from Bayer, has been used as cross-linking agent.

Clear coat base components were formulated by mixing ingredients 1 to 8 in the given order as shown in Table 2. Cross-linking agents were formulated by mixing ingredients 9 and 10 as shown in Table 2. Then clear coat base components and cross-linking agents each have been mixed and homogenized to form clear coats 1 and 2 (CC1 with cyclodextrin compound 1A; CC2 with cyclodextrin compound 1B) and comparative clear coats 1 to 3 (Comp. CC1 with free amine catalyst DABCO; Comp. CC2 with free amine catalyst DBU; Comp. CC3 without catalyst for the SH/NCO reaction).

TABLE 2

|  | Comp. CC3 | Comp. CC1 | CC1 | Comp. CC2 | CC2 |
| --- | --- | --- | --- | --- | --- |
| 1 PETMP | 12.6 | 12.73 | 12.49 | 12.71 | 12.49 |
| 2 DABCO |  | 0.29 |  |  |  |
| 3 DBU |  |  |  | 0.40 |  |
| 4 Compound 1A Cyclodextrin/catalyst |  |  | 2.14 |  |  |
| 5 Compound 1B Cyclodextrin/catalyst |  |  |  |  | 2.13 |
| 6 Polyester resin | 31.00 | 30.94 | 30.37 | 30.91 | 30.38 |
| 7 Butylacetat | 11.37 | 11.30 | 11.09 | 11.29 | 11.08 |
| 8 DBTL | 0.66 | 0.66 | 0.65 | 0.66 | 0.65 |
| 9 Desmodur ® N3600 | 37.58 | 37.47 | 36.77 | 37.43 | 36.78 |
| 10 Butylacetat | 6.63 | 6.61 | 6.49 | 6.61 | 6.49 |
|  | 100.00 | 100.00 | 100.00 | 100.00 | 100.00 |

The amounts given in Table 2 are parts by weight.

PETMP: pentaerythritol tetrakis(3-mercapto propionate), available from BRUNO BOCK Chemische Fabrik GmbH & Co. KG Polyester resin:

A mixture of 911 g of trimethylol propane, 748 g of hexahydrophthalic anhydride and 138 g of dimer fatty acid (EmpolS 1008 from Henkel) was heated to 250° C. Esterification was carried out with water separation until an acid value of less than 5 mg KOH/g was obtained. After cooling to below 125° C., the solids content was adjusted to 70% (1 h/105° C.) with 90 g of xylene and 641 g of methoxypropyl acetate. The polyester polyol had an hydroxyl value of 345 mg KOH/g and an acid value of 4.5 mg KOH/g. The calculated hydroxyl functionality was 5.6 and the calculated molecular mass was 920.

DBTL: dibutyl tin dilaurate, 10% by weight in butylacetate

Each of the clear coats and comparative clear coat 3 have been applied with a doctor blade to glass plates in a resulting dry film thickness of about 35 µm. Drying performance has been determined via pendulum hardness after curing at room temperature and after curing 30 minutes at 60° C. Measurement results and evaluation are given in Table 3. Comparative clear coats 1 and 2 could not be applied due to immediate gelation.

TABLE 3

|  | Comp. CC3 | Comp. CC1 immediate | CC1 | Comp. CC2 immediate | CC2 |
| --- | --- | --- | --- | --- | --- |
| Pot-life (1) | 8 hours | gelation | 120 min | gelation | 130 min |
| Pendulum hardness (2) | 7 | n.a. | 60 | n.a. | 80 |
| Tack (3) | Tacky, soft | n.a. | Tack-free, hard | n.a. | Tack-free, hard | n.a.: not applicable
(1) Potlife as determined in the examples of the present invention is the time within which initial viscosity after mixing base component and cross-linking agent has been doubled. Viscosity has been measured as flow cup viscosity according to DIN EN ISO 2431 with DIN 4 cup, 20° C.
(2) Pendulum hardness (König) has been measured after curing 24 hours at room temperature (according to standard DIN 53505)
(3) Tack has been evaluated after curing 30 minutes at 60° C. with the finger touch test.

The results clearly show that the clear coat compositions prepared according to the invention had remarkably improved pot-life compared with comparative clear coats 1 and 2 containing the same, but free amine catalyst. Comparative clear coats 1 and 2 could not be processed due to immediate gelation, i.e. they were not applicable. The clear coat compositions according to the invention also had acceptable drying properties as can be seen on the basis of the pendulum hardness measured after curing at room temperature and the tack evaluation after curing 30 minutes at 60° C.

The invention claimed is:

1. Coating composition comprising components A) and B), and composition C), as follows:
    A) at least one thiol-functional compound having at least one thiol group;
    B) at least one polyisocyanate cross-linking agent with at least one free isocyanate group; and
    C) at least one catalyst composition, said catalyst composition comprising at least one catalyst for promoting a curing reaction between the at least one thiol group of component A) and the at least one free isocyanate group of component B), the at least one catalyst being bound with cyclodextrin in a guest-host cyclodextrin complex, wherein the catalyst has little or no catalytic activity when bound in the guest-host cyclodextrin complex, wherein the catalyst regains catalytic activity upon release from the cyclodextrin by thermal curing, and wherein the catalyst comprises a metal complex that comprises a metal compound with an organic ligand.

2. The coating composition of claim 1, comprising the at least one catalyst composition C) in a ratio by weight solids of catalyst compound C) to the sum of weight solids of thiol component A) and isocyanate component B) of 0.5 to 15.

3. The coating composition of claim 1, comprising the at least one catalyst composition C) in a ratio by weight solids of catalyst compound C) to the sum of weight solids of thiol component A) and isocyanate component B) of 1 to 8.

4. The coating composition of claim 1, wherein the cyclodextrin is methylated and/or hydroxypropylated cyclodextrin.

5. The coating composition of claim 1, wherein the at least one thiol-functional compound comprises pentaerythritol tetrakis(3-mercapto propionate) or trimethylolpropane tris(3-mercaptopropionate).

6. The coating composition of claim 1, wherein the catalyst composition C) is a solid compound.

7. The coating composition of claim 1, wherein the catalyst composition C) is a liquid compound.

8. The coating composition of claim 1, wherein the metal compound comprises a Periodic Table Group 3 to Group 13 metal.

9. The coating composition of claim 8, wherein the metal compound comprises a Periodic Table Group 4 metal.

10. The coating composition of claim 9, wherein the metal compound comprises zirconium or titanium.

11. The coating composition of claim 1, wherein the metal compound comprises a metal salt.

12. The coating composition of claim 11, wherein the metal compound comprises a metal salt comprising a carboxylate anion.

13. The coating composition of claim 12, wherein the metal compound comprises a metal salt comprising an anion that is selected from the group consisting of: propionate, butyrate, pentanoate, 2-ethyl hexanoate, naphthenate, oxalate, malonate, succinate, glutamate, adipate, and combinations thereof.

14. The coating composition of claim 1, wherein the organic ligand comprises ligands selected from the group consisting of: beta-diketones, alkyl acetoacetates, alcoholates, and combinations thereof.

15. The coating composition of claim 14, wherein the organic ligand comprises ligands selected from the group consisting of: acetyl acetone (2,4-pentanedione), 2,4-heptanedione, 6-methyl-2,4-heptadione, 2,4-octanedione, propoxide, isopropoxide, butoxide, and combinations thereof.

16. The coating composition of claim 1, wherein the metal complex is selected from the group consisting of: aluminium complexed with 2,4-pentanedione, aluminium triacetyl acetonate, zirconium tetraacetyl acetonate, zirconium tetrabutanolate, titanium tetrabutanolate, zirconium complexed with 6-methyl-2,4-heptadione, aluminium triisopropoxide, titanium diisopropoxide bis-2,4(pentadionate), titanium acetyl acetonate, and combinations thereof.

17. A process for preparing the coating composition of claim 1, wherein the process comprises performing steps I, II, and III, as follows:

I. providing component A);

II. mixing component A) provided in step I with catalyst composition C) to obtain a first mixed composition; and III. mixing the first mixed composition obtained in step II with polyisocyanate component B).

18. A process for using the coating composition of claim 1 for preparing a coating layer, wherein the process comprises performing steps 1) and 2), as follows:

1) applying to a substrate the coating composition of claim 1 to form a coating layer on the substrate; and 2) thermally curing the coating layer.

19. The process of claim 18, wherein the coating composition functions as a primer, a primer surfacer, a clear top coat composition, or a pigmented single-stage top coat composition.

20. The process of claim 18, wherein the substrate comprises an automotive body or an automotive body part.

* * * * *